(12) United States Patent
Ahn et al.

(10) Patent No.: US 11,522,189 B2
(45) Date of Patent: Dec. 6, 2022

(54) POSITIVE ELECTRODE FOR RECHARGEABLE LITHIUM BATTERY, PREPARING METHOD THEREOF, AND RECHARGEABLE LITHIUM BATTERY COMPRISING POSITIVE ELECTRODE

(71) Applicant: SAMSUNG SDI CO., LTD., Yongin-si (KR)

(72) Inventors: Kiyong Ahn, Yongin-si (KR); Jongmin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/102,412

(22) Filed: Nov. 23, 2020

(65) Prior Publication Data

US 2021/0083287 A1 Mar. 18, 2021

Related U.S. Application Data

(63) Continuation-in-part of application No. 16/209,659, filed on Dec. 4, 2018, now Pat. No. 10,847,781.

(30) Foreign Application Priority Data

| Dec. 4, 2017 | (KR) | 10-2017-0165431 |
| Dec. 3, 2018 | (KR) | 10-2018-0153649 |
| Sep. 24, 2020 | (KR) | 10-2020-0124255 |

(51) Int. Cl.
*H01M 4/525* (2010.01)
*H01M 4/36* (2006.01)
(Continued)

(52) U.S. Cl.
CPC ............ *H01M 4/525* (2013.01); *C01G 53/50* (2013.01); *H01M 4/043* (2013.01);
(Continued)

(58) Field of Classification Search
CPC ...... H01M 4/131; H01M 4/525; H01M 4/505; H01M 4/1391; H01M 4/0404;
(Continued)

(56) References Cited

U.S. PATENT DOCUMENTS

| 6,589,499 B2 * | 7/2003 | Gao | ........................ | C01G 51/44 |
|  |  |  |  | 423/596 |
| 9,589,499 B2 | 3/2017 | Park |  |  |

(Continued)

FOREIGN PATENT DOCUMENTS

| CN | 101167209 A | 4/2008 |
| CN | 101714630 A | 5/2010 |

(Continued)

OTHER PUBLICATIONS

U.S. Office Action dated Oct. 20, 2021, issued in U.S. Appl. No. 17/073,124 (7 pages).

(Continued)

*Primary Examiner* — Matthew J Merkling
(74) *Attorney, Agent, or Firm* — Lewis Roca Rothgerber Christie LLP (57) ABSTRACT

A positive electrode for a rechargeable lithium battery includes a positive active material for a rechargeable lithium battery that includes a first positive active material including a secondary particle including at least two agglomerated primary particles, where at least a portion of the primary particles has a radial arrangement structure, and a second positive active material having a monolith structure, wherein the first and second positive active materials each include a nickel-based positive active material, and an X-ray diffraction (XRD) peak intensity ratio (I(003)/I(104)) of the positive electrode is greater than or equal to about 3. Further embodiments provide a method of manufacturing the posi- (Continued)

tive electrode for rechargeable lithium battery, and a rechargeable lithium battery including the same.

13 Claims, 4 Drawing Sheets

(51) Int. Cl.
| | |
|---|---|
| H01M 4/04 | (2006.01) |
| H01M 4/131 | (2010.01) |
| H01M 4/134 | (2010.01) |
| H01M 4/1391 | (2010.01) |
| H01M 4/1395 | (2010.01) |
| H01M 4/505 | (2010.01) |
| H01M 10/0525 | (2010.01) |
| C01G 53/00 | (2006.01) |
| H01M 4/02 | (2006.01) |

(52) U.S. Cl.
CPC ........ *H01M 4/0404* (2013.01); *H01M 4/0471* (2013.01); *H01M 4/131* (2013.01); *H01M 4/134* (2013.01); *H01M 4/1391* (2013.01); *H01M 4/1395* (2013.01); *H01M 4/366* (2013.01); *H01M 4/505* (2013.01); *H01M 10/0525* (2013.01); *C01P 2002/74* (2013.01); *H01M 2004/024* (2013.01); *H01M 2004/028* (2013.01)

(58) Field of Classification Search
CPC .... H01M 4/043; H01M 4/0471; H01M 4/134; H01M 4/366
See application file for complete search history.

(56) References Cited

U.S. PATENT DOCUMENTS

| | | | |
|---|---|---|---|
| 10,056,605 B2 | 8/2018 | Oh et al. | |
| 2004/0058243 A1 | 3/2004 | Ohzuku et al. | |
| 2007/0122705 A1 | 5/2007 | Paulsen et al. | |
| 2008/0026292 A1 | 1/2008 | Paulsen et al. | |
| 2008/0248391 A1 | 10/2008 | Wakasugi et al. | |
| 2009/0029253 A1 | 1/2009 | Itou et al. | |
| 2009/0258296 A1 | 10/2009 | Kawasato et al. | |
| 2010/0081055 A1 | 4/2010 | Konishi et al. | |
| 2011/0079752 A1 | 4/2011 | Park et al. | |
| 2011/0226986 A1 | 9/2011 | Wang et al. | |
| 2011/0240913 A1 | 10/2011 | Kim et al. | |
| 2012/0085967 A1* | 4/2012 | Yokoyama | C01G 45/1228 252/182.1 |
| 2012/0100429 A1 | 4/2012 | Sueki et al. | |
| 2012/0261610 A1 | 10/2012 | Paulsen et al. | |
| 2013/0316237 A1 | 11/2013 | Miki | |
| 2014/0106212 A1 | 4/2014 | Choi et al. | |
| 2014/0131633 A1 | 5/2014 | Ito et al. | |
| 2014/0205906 A1 | 7/2014 | Kudo et al. | |
| 2014/0212759 A1 | 7/2014 | Blangero et al. | |
| 2015/0010819 A1 | 1/2015 | Lee et al. | |
| 2015/0064577 A1 | 3/2015 | Natsui et al. | |
| 2015/0093580 A1 | 4/2015 | Kobayashi et al. | |
| 2015/0228971 A1 | 8/2015 | Kim et al. | |
| 2015/0340686 A1 | 11/2015 | Sun et al. | |
| 2016/0156020 A1 | 6/2016 | Tokoro et al. | |
| 2016/0301069 A1 | 10/2016 | Kwak et al. | |
| 2016/0380263 A1* | 12/2016 | Nakayama | H01M 4/366 429/223 |
| 2017/0222211 A1 | 8/2017 | Ryu et al. | |
| 2017/0222225 A1 | 8/2017 | Kang et al. | |
| 2017/0309910 A1 | 10/2017 | Jo et al. | |
| 2017/0317342 A1 | 11/2017 | Kang et al. | |
| 2017/0358799 A1 | 12/2017 | Gunji et al. | |
| 2018/0026268 A1* | 1/2018 | Kim | H01M 4/525 429/223 |
| 2018/0048015 A1 | 2/2018 | Lee et al. | |
| 2018/0108940 A1 | 4/2018 | Kwon et al. | |
| 2018/0248180 A1 | 8/2018 | Liu et al. | |
| 2018/0261842 A1 | 9/2018 | Park et al. | |
| 2018/0316005 A1 | 11/2018 | Shin et al. | |
| 2019/0020024 A1 | 1/2019 | Wang et al. | |
| 2019/0044127 A1 | 2/2019 | Kim | |
| 2019/0173076 A1* | 6/2019 | Kim | C01G 53/006 |
| 2019/0355981 A1 | 11/2019 | Chang et al. | |
| 2020/0127276 A1 | 4/2020 | Kim et al. | |
| 2020/0185714 A1 | 6/2020 | Han et al. | |
| 2020/0295368 A1 | 9/2020 | Kong et al. | |
| 2022/0029147 A1 | 1/2022 | Ogawa et al. | |

FOREIGN PATENT DOCUMENTS

| | | |
|---|---|---|
| CN | 107251282 A | 10/2017 |
| EP | 1876664 A1 | 1/2008 |
| EP | 2169745 A1 | 3/2010 |
| EP | 3425703 B1 | 9/2019 |
| JP | 2001-167761 A | 6/2001 |
| JP | 2013-038022 A | 2/2013 |
| JP | 2013-120676 A | 6/2013 |
| JP | 2015-076397 A | 4/2015 |
| JP | 2016-76294 A | 5/2016 |
| JP | 6544951 B2 | 7/2019 |
| KR | 2003-0045853 A | 6/2003 |
| KR | 10-2006-0105039 A | 10/2006 |
| KR | 10-2009-0032138 A | 3/2009 |
| KR | 10-2010-0130522 A | 12/2010 |
| KR | 10-2011-0109879 A | 10/2011 |
| KR | 10-1154880 B1 | 6/2012 |
| KR | 10-1244050 B1 | 3/2013 |
| KR | 10-2014-0025597 A | 3/2014 |
| KR | 10-1452950 B1 | 10/2014 |
| KR | 10-1593401 B1 | 2/2016 |
| KR | 10-1595322 B1 | 2/2016 |
| KR | 10-1604509 B1 | 3/2016 |
| KR | 10-2016-0049519 A | 5/2016 |
| KR | 10-2016-0129764 A | 11/2016 |
| KR | 10-2017-0063408 A | 6/2017 |
| KR | 10-2017-0093085 A | 8/2017 |
| KR | 10-1785262 B1 | 10/2017 |
| KR | 10-2018-0059736 A | 6/2018 |
| KR | 10-2018-0121267 A | 11/2018 |
| KR | 10-2019-0006906 A | 1/2019 |
| KR | 10-2019-0065963 A | 6/2019 |
| KR | 10-1989399 B1 | 6/2019 |
| KR | 10-2020-0043612 A | 4/2020 |
| KR | 10-2020-0070649 A | 6/2020 |
| KR | 10-2144056 B1 | 8/2020 |
| KR | 10-2020-0110027 A | 9/2020 |
| KR | 10-2175126 B1 | 11/2020 |
| WO | WO 2015/053580 A1 | 4/2015 |
| WO | WO 2016/129629 A1 | 8/2016 |

OTHER PUBLICATIONS

EPO Extended European Search Report dated Oct. 15, 2021, issued in European Patent Application No. 21170242.8 (10 pages).
EPO Extended European Search Report dated Jul. 23, 2021, issued in European Patent Application No. 18885458.2 (7 pages).
Kim, Yongseon et al., "First-principles and experimental investigation of the morphology of layer-structured $LiNiO_2$ and $LiCoO_2$", *Journal of Materials Chemistry*, 2012, vol. 22, pp. 12874-12881.
Duan, Jianguo et al., "Enhanced compacting density and cycling performance of Ni-riched electrode via building mono dispersed micron scaled morphology", *Journal of Alloys and Compounds*, vol. 695 (2017) pp. 91-99.
International Search Report and Written Opinion for patent application No. PCT/KR2018/015220, dated May 24, 2019, 10 pages.
Sun, Yang-Kook, et al., "Synthesis and Characterization of Li[(Ni0.8Co0.1Mn0.1)0.8(Ni0.5Mn0.5)0.2]O2 with the Microscale Core-Shell Structure as the Positive Electrode Material for Lithium Batteries," J. Am. Chem. Soc., vol. 127, 2005, 8 pages.
Korean Office Action dated May 21, 2020, for corresponding Korean Patent Application No. 10-2018-0153649 (6 pages).

(56) References Cited

OTHER PUBLICATIONS

Korean Intellectual Property Office Notice of Allowance for corresponding Korean Patent Application No. 10-2018-0153649, dated Sep. 22, 2020, 5 pages.
Chinese Office Action, with English translation, dated Nov. 19, 2021, issued in corresponding Chinese Patent Application No. 201880077888.5 (22 pages).
Korean Office Action from Application No. 10-2020-0124255, dated Feb. 23, 2022, 7 pages.
U.S. Notice of Allowance from U.S. Appl. No. 17/073,124, dated Feb. 8, 2022, 8 pages.
U.S. Office Action from U.S. Appl. No. 17/102,332, dated Dec. 14, 2021, 9 pages.
U.S. Notice of Allowance from U.S. Appl. No. 16/209,659, dated Jul. 17, 2020, 8 pages.
U.S. Restriction Requirement from U.S. Appl. No. 16/209,659, dated Mar. 27, 2020, 5 pages.
Notice of Allowance for U.S. Appl. No. 17/073,124 dated Apr. 8, 2022, 5 pages.
Final Rejection for U.S. Appl. No. 17/102,332 dated Apr. 11, 2022, 7 pages.
European Search Report dated Apr. 8, 2022 for European Patent Application No. 21206169.1, 9 pages.
Advisory Action for U.S. Appl. No. 17/102,332 dated Jun. 7, 2022, 3 pages.
Notice of Allowance for U.S. Appl. No. 17/073,124 dated Aug. 5, 2022, 5 pages.
Notice of Allowance for U.S. Appl. No. 17/102,332 dated Aug. 17, 2022, 8 pages.
U.S. Restriction Requirement dated Sep. 23, 2022, issued in U.S. Appl. No. 17/186,502 (6 pages).

* cited by examiner

POSITIVE ELECTRODE FOR RECHARGEABLE LITHIUM BATTERY, PREPARING METHOD THEREOF, AND RECHARGEABLE LITHIUM BATTERY COMPRISING POSITIVE ELECTRODE

CROSS-REFERENCE TO RELATED APPLICATION

This application is a continuation-in-part of U.S. patent application Ser. No. 16/209,659 filed in the United States Patent and Trademark Office on Dec. 4, 2018, which claims priority to and the benefit of Korean Patent Application No. 10-2017-0165431, filed in the Korean Intellectual Property Office on Dec. 4, 2017, and Korean Patent Application No. 10-2018-0153649, filed in the Korean Intellectual Property Office on Dec. 3, 2018, the entire content of each of which is incorporated herein by reference.

This application claims priority to and the benefit of Korean Patent Application No. 10-2020-0124255, filed in the Korean Intellectual Property Office on Sep. 24, 2020, the entire content of which is incorporated herein by reference.

BACKGROUND

1. Field

One or more aspects of example embodiments of the present disclosure are related to a positive electrode for a rechargeable lithium battery, a preparing method thereof, and a rechargeable lithium battery including the same.

2. Description of the Related Art

As portable electronic devices, communication devices, and/or the like are developed, there is a need for development of a rechargeable lithium battery having a high energy density.

A positive active material of a rechargeable lithium battery may be a lithium nickel manganese cobalt composite oxide, a lithium cobalt oxide, and/or the like. When such positive active materials are used, the cycle-life of a rechargeable lithium battery may be decreased, resistance may be increased, and capacity characteristics may be insufficient due to cracks generated in the positive active material as charging and discharging are repeated.

SUMMARY

One or more aspects of example embodiments of the present disclosure are directed toward a positive electrode for rechargeable lithium battery having improved cycle-life characteristics, efficiency characteristics, and/or high temperature stability while having high capacity, a preparing method thereof, and a rechargeable lithium battery including the same.

One or more example embodiments of the present disclosure provide a positive electrode for a rechargeable lithium battery that includes a positive active material including: a first positive active material including a secondary particle including at least two agglomerated primary particles, where at least one part of the primary particles (e.g., at least one part or all part(s) of each of the primary particles) has a radial arrangement structure; and a second positive active material having a monolith structure, wherein the first positive active material and the second positive active material each include a nickel-based positive active material, and an X-ray diffraction (XRD) peak intensity ratio (I(003)/I(104)) (e.g., a peak intensity of a (003) plane to a peak intensity of the (104) plane) of the positive electrode is greater than or equal to about 3.

One or more example embodiments of the present disclosure provide a method of preparing a positive electrode for rechargeable lithium battery that includes: subjecting a first precursor to a first heat-treatment in a first oxidizing gas atmosphere to obtain a first nickel-based oxide, subjecting a second precursor to a second heat-treatment in a second oxidizing gas atmosphere to obtain a second nickel-based oxide having a monolith structure, mixing the first nickel-based oxide and the second nickel-based oxide to obtain a mixture, and then subjecting the mixture to third heat-treatment in a third oxidizing gas atmosphere to obtain a positive active material including a first positive active material and a second positive active material having a monolith structure, mixing the positive active material, a conductive agent, and a binder in a solvent to prepare a positive active material slurry, coating the positive active material slurry on a current collector, and then drying it to prepare a positive electrode, and pressing the positive electrode to a density of greater than or equal to about 3.4 g/cc.

One or more example embodiments of the present disclosure provide a rechargeable lithium battery including the aforementioned positive electrode, a negative electrode, and an electrolyte between the positive electrode and the negative electrode.

One or more example embodiments of the present disclosure may provide a positive electrode for rechargeable lithium battery and a rechargeable lithium battery including the same, the battery having improved cycle-life characteristics, efficiency characteristics, and/or high temperature stability while having high capacity.

DETAILED DESCRIPTION OF THE EMBODIMENTS

The present disclosure will be described more fully hereinafter with reference to the accompanying drawings, in which example embodiments of the present disclosure are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification, and duplicative descriptions thereof may not be provided.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present. Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

The sizes, particle diameters, or lengths of various particles may be represented by a single measurement to show an average size of a group of particles. Generally used methods of reporting particle sizes include a mode diameter showing the maximum value of the particle size distribution (e.g., most common particle size within the distribution), a median diameter corresponding to the integral center value of the particle size distribution curve, one or more average diameters (e.g., numeral average, length average, area average, mass average, volume average, etc.), and/or the like. Unless otherwise specified, the average sizes, average particle diameters, or average lengths as reported in this disclosure refer to volume average sizes, volume average diameters, or volume average lengths, or may be obtained by measuring D50 (the particle diameter at the 50th percentile of the particle size distribution). In some embodiments, the values may be measured through a particle size analyzer that analyzes the size of particles by utilizing diffraction, or may be measured from a scanning electron microscope photograph.

The term "monolith structure" refers to a structure in which a morphology of each particle is separated and/or dispersed in independent phases separated from each other.

According to embodiments of the present disclosure, a positive electrode for rechargeable lithium battery includes a positive active material including: a first positive active material including a secondary particle including at least two agglomerated primary particles, where at least one part of the primary particles has a radial arrangement structure; and a second positive active material having a monolith structure, wherein the first positive active material and the second positive active material each include a nickel-based positive active material, and an X-ray diffraction (XRD) peak intensity ratio (I(003)/I(104)) (e.g., of a peak intensity of a (003) plane to a peak intensity of the (104) plane) of the positive electrode is greater than or equal to about 3, and thereby a cycle-life of the rechargeable lithium battery may be improved while maximizing or increasing the capacity thereof.

The positive electrode for the rechargeable lithium battery according to the embodiment may have a XRD peak intensity ratio I(003)/I(104, of greater than or equal to about 3. Herein, the term "diffraction peak intensity" refers to the intensity expressed by a maximum value (maximum height) of an XRD diffraction peak. The X-ray diffraction peak intensity ratio of the (003) plane and the (104) plane may be obtained from the X-ray diffraction plot obtained from the electrode plate of the positive electrode. The term "(003) plane" refers to the lattice plane corresponding to a Miller index (003), and the term "(104) plane" refers to the lattice plane corresponding to a Miller index (104).

In the positive electrode for a rechargeable lithium battery, when the positive active material (which includes the first positive active material including a secondary particle including at least two agglomerated primary particles, where at least one portion of the primary particles has a radial arrangement structure; and the second positive active material having a monolith structure) is applied as a nickel-based positive active material, the (003) plane has arrangement properties (e.g., is preferentially arranged into a set or predetermined orientation) during pressing of the electrode plate so that the (003) plane exhibits a higher intensity peak during X-ray diffraction analysis of the electrode plate. Accordingly, the positive electrode for the rechargeable lithium battery according to one embodiment may have an XRD peak intensity ratio (I(003)/I(104)) of greater than or equal to about 3.

When the X-ray diffraction peak intensity ratio (I(003)/I(104)) is less than about 3, a rechargeable lithium battery simultaneously (e.g., concurrently) having sufficient maximum capacity and cycle-life characteristics may not be obtained, and there may also be a problem that lithium is not smoothly intercalated and deintercalated in the positive electrode, thus deteriorating electric power characteristics. The XRD peak intensity ratio (I(003)/I(104)) of the positive electrode for a rechargeable lithium battery may be, for example, greater than or equal to about 3.1, greater than or equal to about 3.2, greater than or equal to about 3.3, greater than or equal to about 3.4, or greater than or equal to about 3.5. When the diffraction peak intensity ratio satisfies the ranges, the positive electrode and the rechargeable lithium battery including the same may simultaneously or concurrently exhibit high-capacity, excellent cycle-life characteristics, efficiency characteristics, and high temperature stability.

In some embodiments, the positive electrode for a rechargeable lithium battery according to one embodiment may have mixture density of greater than or equal to about 3.4 g/cc. The term "mixture density" may refer to the pressed density during the manufacture of the electrode plate (e.g., the density of the positive electrode after pressing). When the mixture density is greater than or equal to about 3.4 g/cc, the X-ray diffraction peak intensity ratio (I(003)/I(104)) of greater than or equal to about 3 with respect to the positive electrode may be secured to realize excellent battery safety and cycle-life characteristics, and the capacity per volume (e.g., specific capacity) of a battery may be increased to realize a high-capacity rechargeable lithium battery. When the mixture density is within the above ranges, problems of insufficient electrolyte impregnation, rate capability deterioration, crushing of active material particles, current collector breakage, and/or the like may be prevented or reduced to obtain a positive electrode having excellent discharge capacity.

Hereinafter, referring to FIGS. 1 to 3, a positive active material for a rechargeable lithium battery according to embodiments of the present disclosure is described.

A positive active material for a rechargeable lithium battery according to embodiments of the present disclosure includes a first positive active material including a secondary particle including at least two agglomerated primary particles, and a second positive active material having a monolith structure. At least one part of the secondary particle may have a radial arrangement structure, and the first positive active material and the second positive active material may each include a nickel-based positive active material.

Hereinafter, the first positive active material according to embodiments of the present disclosure is described.

The first positive active material may include a secondary particle including at least two agglomerated primary particles. At least one part of the primary particles (e.g., at least one part or all part(s) of each of the primary particles) may have a plate shape.

Figure 1:
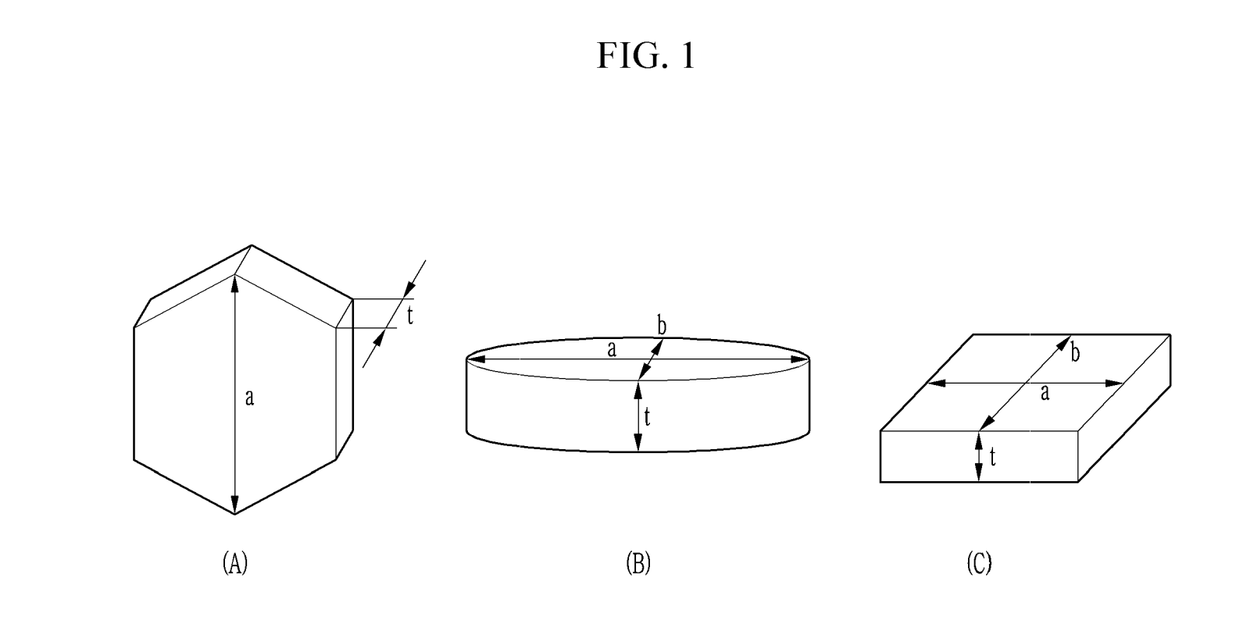
FIG. 1 is a schematic view showing shapes of the plate-shaped primary particles according to embodiments of the present disclosure.

FIG. 1 is a schematic view showing one or more suitable plate shapes of the primary particles according to embodiments of the present disclosure. Referring to FIG. 1, a plate-shaped primary particle according to embodiments of the present disclosure may have any suitable shape, such as (A) a polygonal nanoplate shape (such as hexagon and/or the like), (B) a nanodisk shape, and/or (C) a rectangular parallelepiped shape, each having a basic plate-shaped structure. In FIG. 1, "a" refers to a length of the major axis of the plate-shaped primary particle, "b" refers to a length of the minor axis, and "t" refers to a thickness thereof. Herein, the length a of the major axis may refer to a maximum (largest) length based on the widest surface of the plate-shaped primary particle, and the length b of the minor axis may refer to a minimum (smallest) length on the widest surface of the plate-shaped primary particle. In the plate-shaped primary particle, a direction in which the thickness t is defined may be referred to as a thickness direction, and a direction containing the length a of the major axis and the length b of the minor axis may be referred to as a plane direction. The thickness t of the plate-shaped primary particle may be smaller than the length a of the major axis and the length b of the minor axis, which are lengths in the plane direction. The length a of the major axis among the lengths in the plane direction may be longer than or equal to the length b of the minor axis.

The first positive active material according to embodiments of the present disclosure may have irregular pores (an irregular porous structure) in the internal part and/or in the external part of the secondary particle. The term "irregular porous structure" may refer to a structure in which the pore sizes and shapes are not regular and do not have uniformity (e.g., are not uniform). Here, the term "pore size" may refer to the average diameter or length of the inside of the pore. The internal part of the irregular porous structure may include primary particles similar or substantially identical to those in the external part thereof. The primary particles in the internal part of the secondary particle may be arranged without regularity, unlike the primary particles in the external part.

The term "external part" may refer to a region (e.g., of the particle) within about 30 length % to about 50 length % from the outermost surface, for example, within about 40 length % from the outermost surface with respect to the distance from the center to the surface of the secondary particle, or in some embodiments, may refer to a region within about 2 μm from the outermost surface of the secondary particle. The term "internal part" may refer to a region (e.g., of the particle) within about 50 length % to about 70 length % from the center, for example, within about 60 length % from the center with respect to the distance from the center to the surface of the secondary particle, or in some embodiments, a region excluding the region within about 2 μm, about 4 μm, or about 6 μm from the outermost surface of the secondary particle.

The secondary particle of the first positive active material according to embodiments of the present disclosure may include an open pore in the center of the internal part with a size (average diameter) of less than about 150 nm, for example, about 10 nm to about 148 nm. The open pore may be an exposed pore into which an electrolyte solution may flow in and out. In some embodiments, the open pore may be formed at a depth of less than or equal to about 150 nm, for example, about 0.001 nm to about 100 nm, or about 1 nm to about 50 nm, on average, from the surface of the secondary particle.

The first positive active material according to embodiments of the present disclosure may include a secondary particle formed by arranging the long axis (axes) of at least one part of the primary particles in a radial direction. At least one part (e.g., some) of the primary particles may have a radial arrangement structure. For example, each of the primary particles may have a plate shape, and a long-axis of at least one part of the primary particles (e.g., the external part) may be arranged in a radial direction. FIG. 2 is a schematic view describing a radial shape of a secondary particle according to embodiments of the present disclosure.

Figure 2:
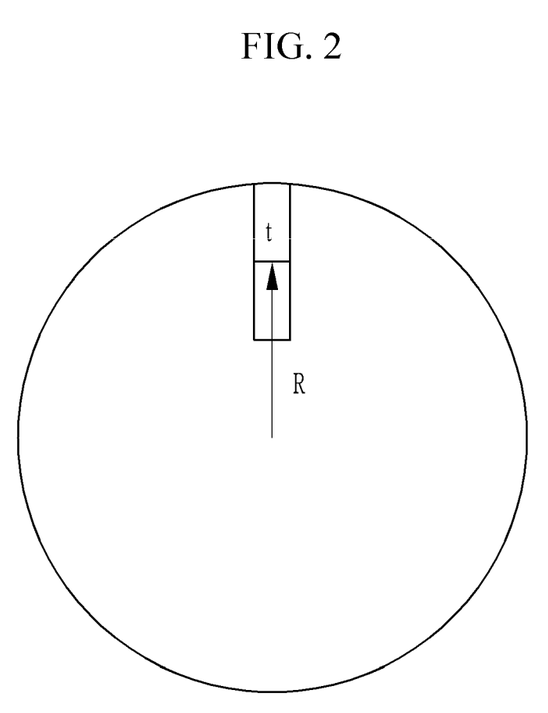
FIG. 2 is a schematic view describing a radial shape of a secondary particle according to embodiments of the present disclosure.

A "radial" arrangement structure refers to a structure in which the thickness (t) directions of the primary particles are arranged perpendicular to or within an angle of about ±5° to perpendicular with respect to the direction (R) toward the center of the secondary particles, as shown in FIG. 2.

The average length of the primary particles of the secondary particle may be about 0.01 μm to about 5 μm. For example, the average length may be about 0.01 μm to about 2 μm, about 0.01 μm to about 1 μm, about 0.02 μm to about 1 μm, or about 0.05 μm to about 0.5 μm. Herein, the term "average length" refers to an average length of the average long-axis length and the average short-axis length in the plane direction of the primary particles when the primary particles have a plate shape, or an average particle diameter when the primary particles have a spherical shape.

An average thickness of the primary particles of the secondary particle may be, for example, greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, greater than or equal to about 900 nm, greater than or equal to about 1 μm, greater than or equal to about 1.2 μm, greater than or equal to about 1.4 μm, and for example, less than or equal to about 13 μm, less than or equal to about 12 μm, less than or equal to about 11 μm, less than or equal to about 10 μm, less than or equal to about 9 μm, less than or equal to about 8 μm, less than or equal to about 7 μm, less than or equal to about 6 μm, less than or equal to about 5 μm, less than or equal to about 4 μm, less than or equal to about 3 μm, or less than or equal to about 2 μm. A ratio between the average thickness and the average length may be about 1:1 to about 1:10, for example about 1:1 to about 1:8, or about 1:1 to about 1:6.

As described above, when the average length, the average thickness, and the ratio between the average thickness and the average length of the primary particles satisfy the above ranges, a relatively large number of lithium diffusion paths between surface grain boundaries and crystal surfaces capable of transferring lithium to the external part of the secondary particle may be exposed, such that lithium diffusivity may be improved, and high initial efficiency and capacity may be enabled, for example when the sizes of the primary particles are sufficiently small and the primary particles are radially arranged in the external part (e.g., of the secondary particle). When the primary particles are arranged radially, the pores exposed at the surface between the primary particles may be directed toward the center direction (e.g., of the secondary particle), thereby promoting lithium diffusion from the surface. When lithium is deintercalated and/or intercalated into the radially arranged primary particles, substantially uniform shrinkage and expansion may be enabled, and the presence of pores in a (001) direction, along which particles expand during lithium intercalation, may alleviate stress caused by expansion. The probability of cracks occurring during shrinkage and expansion may be lowered due to the small sizes of the plate-shaped primary particles, and the pores in the internal part of the secondary particle may additionally alleviate stress caused by the volume changes, thereby decreasing crack generation between the primary particles during charging and discharging, improving cycle-life characteristics, and reducing a resistance increase.

Closed pores may be present in the internal part of the secondary particle, and closed pores and/or open pores may be present in the external part of the secondary particle. The closed pores may exclude or mostly exclude an electrolyte, while the open pores may include an electrolyte therein. Each closed pore may be an independent pore formed by closing the wall surfaces of the pore so that they are not connected to other pores; while the open pores may be formed as continuous pores connected to the outside of the particles when at least one part of each pore wall is formed to be an open structure.

The positive active material for a rechargeable lithium battery according to embodiments of the present disclosure may minimize or reduce direct contact between the cracked surface and the electrolyte solution even when cracks are generated, thereby suppressing an increase of a sheet resistance, due to the first positive active material as described above.

Figure 3:
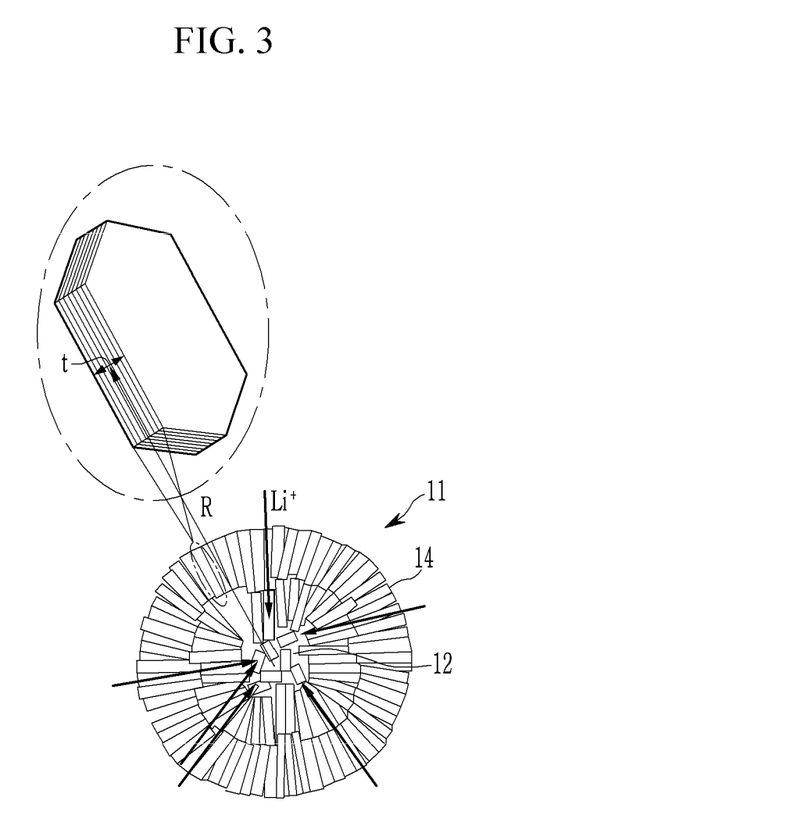
FIG. 3 is a schematic view showing a cross-sectional structure of a secondary particle according to embodiments of the present disclosure.

FIG. 3 is a schematic view showing a cross-sectional structure of a secondary particle according to embodiments of the present disclosure.

Referring to FIG. 3, the secondary particle 11 includes an external part 14 in which the plate-shaped primary particles are arranged in a radial direction, and an internal part 12 in which the plate-shaped primary particles are irregularly arranged.

In the internal part 12, a larger amount of empty voids between the primary particles may be present compared to within the external part. The pore sizes and porosity in the internal part may be larger and more irregular than those in the external part. Here, the term "porosity" may refer to the total number of pores in a given particle volume and/or the total volume of the pores in a given particle volume. In FIG. 3, the arrow indicates a direction of lithium ion movement (e.g., during intercalation).

The secondary particle according to embodiments of the present disclosure may have a porous structure in the internal part, so that a diffusion distance of lithium ions to the internal part of the secondary particle may be decreased, and the external part of the secondary particle may be radially arranged toward the surface (e.g., may have radial pores extending toward the surface), so that lithium ions are easily intercalated into the surface. In some embodiments, the sizes of the primary particles of the positive active material for a rechargeable lithium battery may be sufficiently small so that it is easy to secure a lithium transfer path between the crystal grains. In some embodiments, the sizes of the primary particles may be sufficiently small and the pores between primary particles may alleviate volume changes that occur during charging and discharging so that particle stress when the volume changes during charging and discharging is minimized or reduced.

An average particle diameter of the secondary particle of embodiments of the present disclosure may be about 1 μm to about 20 μm. For example, it may be about 1 μm to about 18 μm, about 1 μm to about 16 μm, about 1 μm to about 15 μm, about 1 μm to about 10 μm, about 5 μm to about 20 μm, about 5 μm to about 18 μm, or about 5 μm to about 15 μm. For example, it may be about 1 μm to about 5 μm, about 10 μm to about 20 μm, or about 12 μm to about 20 μm.

The secondary particle according to embodiments of the present disclosure may include radial primary particles and non-radial primary particles. An amount of the non-radial primary particles may be less than or equal to about 20 wt %, about 0.01 wt % to about 10 wt %, or about 0.1 wt % to about 5 wt % based on a total of 100 wt % of the radial primary particles and non-radial primary particles together. When the non-radial primary particles are included in the above range in addition to the radial primary particles within the secondary particle, a rechargeable lithium battery having improved cycle-life characteristics due to easy diffusion of lithium may be manufactured.

Hereinafter, a second positive active material according to embodiments of the present disclosure is described.

The second positive active material according to embodiments of the present disclosure may have a monolith structure. For example, the second positive active material may include or have a form in which a plurality of crystal particles are separated and/or dispersed so as to form independent and/or separated phases for each of the particles rather than a coagulated form, but two or three particles may be attached to each other (e.g., contiguous).

The shape of the second positive active material is not particularly limited, and may have a random shape (such as a sphere, an oval, a plate-shape, and/or a rod).

The second positive active material according to embodiments of the present disclosure may be included in an amount of about 10 wt % to about 50 wt % based on a total weight of the positive active material for a rechargeable lithium battery. For example, the second positive active material may be included in an amount of greater than or equal to about 10 wt %, greater than or equal to about 15 wt %, greater than or equal to about 20 wt %, or greater than or equal to about 25 wt %, and for example, less than or equal to about 50 wt %, less than or equal to about 45 wt %, less than or equal to about 40 wt %, or less than or equal to about 35 wt %. In this way, when the second positive active material having a monolith structure is included within the aforementioned ranges, the residual lithium compound may be minimized or reduced in the positive active material after the synthesis of the active material, and the XRD peak intensity ratio (I(003)/I(104)) of the positive electrode may be suitably secured to be greater than or equal to about 3 to resultantly obtain a rechargeable lithium battery having high-capacity characteristics and improved cycle-life characteristics.

For example, in the positive active material, the first positive active material and the second positive active material may be included in a weight ratio of about 90:10 to about 50:50, about 90:10 to about 60:40, or about 90:10 to about 90:30. When the weight ratio satisfies the ranges, the XRD peak intensity ratio (I(003)/I(104)) of the positive electrode may be suitably secured to be greater than or equal to 3 to resultantly obtain a rechargeable lithium battery having high-capacity characteristics and improved cycle-life characteristics.

As described above, when the second positive active material is formed to have a monolith structure, the positive active material for a rechargeable lithium battery according to one embodiment may be controlled to have a residual lithium concentration of for example, less than or equal to about 1200 ppm, less than or equal to about 1100 ppm, less than or equal to about 1000 ppm, less than or equal to about 990 ppm, less than or equal to about 980 ppm, or less than or equal to about 970 ppm. Accordingly, a nickel-based active material with a large nickel content may secure a low residual lithium concentration within the aforementioned ranges.

In some embodiments, the primary particles in the first positive active material and the second positive active material may each have a suitable size. An average particle diameter of the second positive active material may be about 0.05 μm to about 10 μm. For example, it may be about 0.1 μm to about 10 μm. For example, it may be about 0.1 μm to about 5 μm, or about 1 μm to about 8 μm, or about 3 μm to about 6 μm. In this way, the primary particles of the first positive active material and the second positive active material may each have a suitable size, so that a density of the positive active material for a rechargeable lithium battery according to embodiments of the present disclosure may be further increased.

The first positive active material according to embodiments of the present disclosure and the second positive active material may each independently be or include a nickel-based positive active material represented by Chemical Formula 1:

$$Li_a(Ni_{1-x-y-z}Co_xMn_yM_z)O_2 \quad \text{Chemical Formula 1}$$

wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and $0.95 \leq a \leq 1.3$, $x \leq (1-x-y-z)$, $y \leq (1-x-y-z)$, $0 < x < 1$, $0 \leq y < 1$, and $0 \leq z < 1$. Here, in the nickel-based positive active material represented by Chemical Formula 1, the nickel content may be greater than or equal to the cobalt content, the nickel content may be greater than or equal to the manganese content, and the nickel content may be greater than or equal to the M content.

In Chemical Formula 1, $0.95 \leq a \leq 1.3$, for example, $1.0 \leq a \leq 1.1$; $0 < x \leq 0.33$, for example $0.1 \leq x \leq 0.33$; $0 \leq y \leq 0.5$, for example $0.05 \leq y \leq 0.3$; $0 \leq z \leq 0.05$; and $0.33 \leq (1-x-y-z) \leq 0.95$, for example $0.33 \leq (1-x-y-z) \leq 0.95$.

For example, in Chemical Formula 1, $0 \leq z \leq 0.05$, $0 \leq x \leq 0.33$, and $0 \leq y \leq 0.33$.

For example, in Chemical Formula 1, $(1-x-y-z) \geq 0.4$, for example $(1-x-y-z) \geq 0.5$, or $(1-x-y-z) \geq 0.6$.

In the nickel-based positive active material, the nickel content may be greater than or equal to about 50 mol %, for example greater than or equal to about 55 mol %, or greater than or equal to about 60 mol % and for example less than or equal to about 95 mol %, less than or equal to about 90 mol %, less than or equal to about 80 mol %, less than or equal to about 70 mol %, less than or equal to about 60 mol %, or less than or equal to about 63 mol %, for example about 50 mol % to about 95 mol %, for example about 70 mol % to about 95 mol %, or about 80 mol % to about 95 mol % based on a total amount of transition metals (Ni, Co, Mn, etc.). In the nickel-based positive active material, the nickel content may be larger than each of the manganese content, the cobalt content, and the element M content.

In the nickel-based positive active material, the nickel content may be larger than the content of the other transition metals based on 1 mol (e.g. molar equivalent) of total transition metals. In this way, when the nickel-based positive active material having a large nickel content is used as the first positive active material and the second positive active material, lithium diffusivity may be high, conductivity may be good, and a higher capacity at the same voltage may be obtained when the rechargeable lithium battery employing the positive electrode including the same is used.

In some embodiments, a pressed density of the positive active material for a rechargeable lithium battery including the first positive active material and the second positive active material may be, for example, greater than or equal to about 3.3 g/cc, greater than or equal to about 3.35 g/cc, greater than or equal to about 3.4 g/cc, greater than or equal to about 3.45 g/cc, or greater than or equal to about 3.5 g/cc. In some embodiments, the pressed density of the positive active material for a rechargeable lithium battery may be obtained by inserting about 3 g of the positive active material for a rechargeable lithium battery in a pressed density-measuring device and then, pressing it with a power of about 3 tons for about 30 seconds. Accordingly, the positive active material for a rechargeable lithium battery including the first and second positive active materials having different sizes according to embodiments of the present disclosure may secure a positive electrode having excellent electrode plate density.

Hereinafter, a positive active material for a rechargeable lithium battery according embodiments of the present disclosure is explained.

The positive active material for a rechargeable lithium battery according to embodiments of the present disclosure includes the first positive active material including the secondary particle including at least two agglomerated primary particles, wherein at least one part of the primary particles has a radial arrangement structure; and the second positive active material having the monolith structure. In some embodiments, the secondary particle may further include particles having a monolith structure. For example, the positive active material may have substantially the same constitution (e.g., composition) as described above, except that the secondary particle of the first positive active material may additionally further include particles having a monolith structure.

In some embodiments, the particles having a monolith structure in the first positive active material may be adhered or attached to an external part of the secondary particle, and/or in some embodiments, dispersed in an internal part thereof. For example, the particles having a monolith structure may be agglomerated (physically and/or chemically bound) to the secondary particle, or may not be physically and/or chemically bound to the secondary particle but may fill pores in the secondary particle and/or contact walls of the pores.

Hereinafter, referring to FIG. 4, a structure of a rechargeable lithium battery including a positive electrode including the positive active material for a rechargeable lithium battery according to embodiments of the present disclosure, and a method of manufacturing the rechargeable lithium battery are illustrated.

Figure 4:
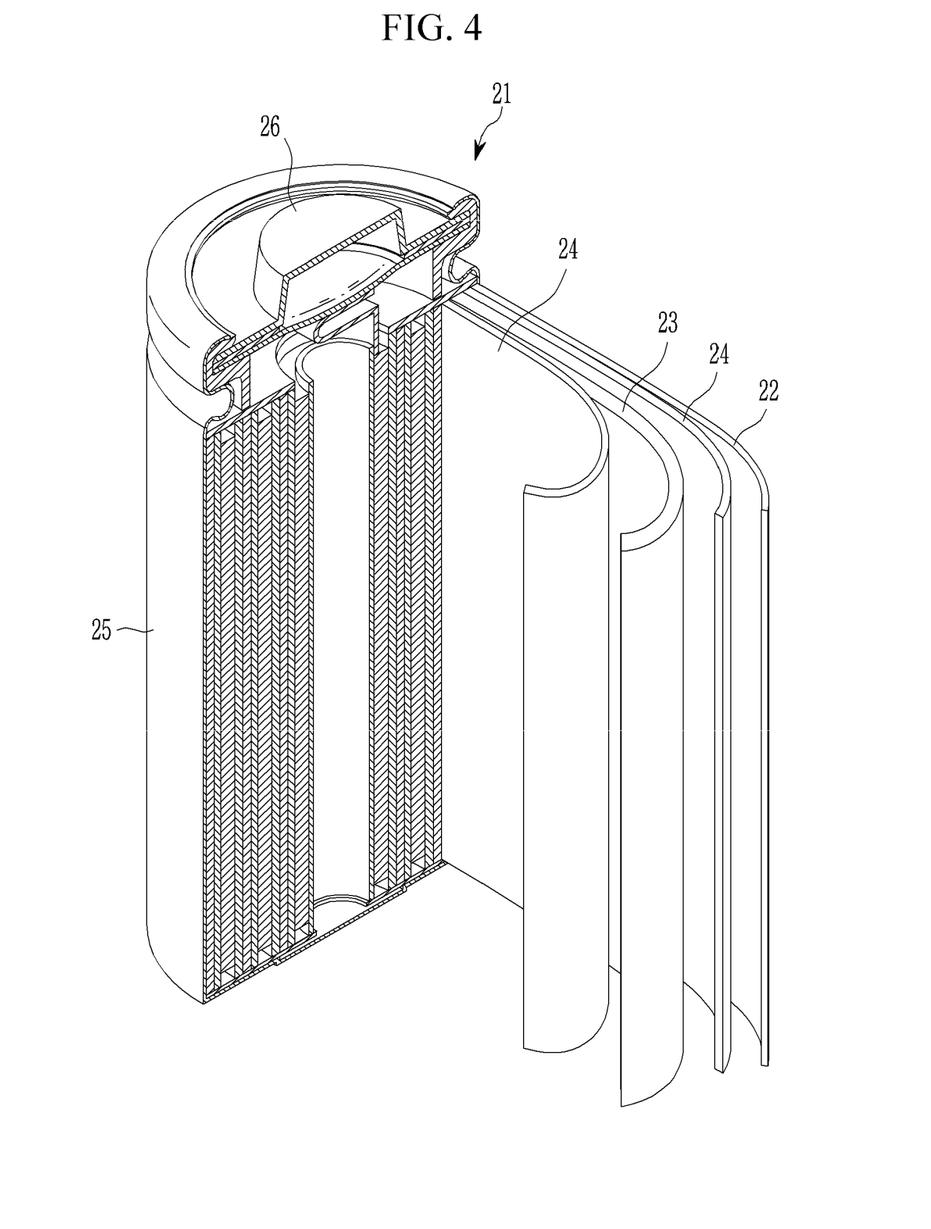
FIG. 4 is a schematic view showing a structure of a rechargeable lithium battery including a positive electrode including a positive active material for a rechargeable lithium battery according to embodiments of the present disclosure.

FIG. 4 is a schematic view showing a structure of a rechargeable lithium battery including a positive electrode including a positive active material for a rechargeable lithium battery according to embodiments of the present disclosure. Referring to FIG. 4, a rechargeable lithium battery 21 includes a positive electrode 23 including the positive active material for a rechargeable lithium battery, a negative electrode 22, and a separator 24.

The positive electrode 23 and the negative electrode 22 may be manufactured by coating a composition for forming a positive active material layer and a composition for forming a negative active material layer on each current collector, respectively, and drying the same.

The composition for the positive active material layer may be prepared by mixing a positive active material, a conductive agent, a binder, and a solvent, wherein the positive active material is the aforementioned positive active material.

The binder may facilitate binding between the active materials, conductive agent, and/or the like as well as binding these materials to a current collector, and may be added in an amount of about 1 to about 50 parts by weight based on a total weight of 100 parts by weight of the positive active material. Non-limiting examples of such a binder include polyvinylidene fluoride, polyvinyl alcohol, carboxymethyl cellulose (CMC), starch, hydroxypropyl cellulose, recycled cellulose, polyvinylpyrrolidone, tetrafluoroethylene, polyethylene, polypropylene, an ethylene-propylene-diene terpolymer (EPDM), sulfonated EPDM, a styrene butadiene rubber, a fluorine rubber, various copolymers, and/or the like. The amount thereof may be about 1 to about 5 parts by weight, for example about 2 to about 5 parts by weight based on a total weight of 100 parts by weight of the positive active material. When the amount of the binder is within this range, the binding force of the active material layer to the current collector may be suitable or good.

The conductive agent is not particularly limited as long as it does not cause a chemical change of a battery (e.g. an unwanted chemical reaction), and has conductivity. Non-limiting examples of the conductive agent include graphite (such as natural graphite and/or artificial graphite); a carbon-based material (such as carbon black, acetylene black, KETJENBLACK®, channel black, furnace black, lamp black, summer black, and/or the like); a conductive fiber (such as a carbon fiber and/or a metal fiber, and/or the like); carbon fluoride; a metal powder (such as an aluminum and/or nickel powder); zinc oxide, a conductive whisker (such as potassium titanate, and/or the like); a conductive metal oxide (such as a titanium oxide); and a conductive material (such as a polyphenylene derivative, and/or the like).

The amount of the conductive agent may be about 1 to about 5 parts by weight, for example about 2 to about 5 parts by weight based on a total weight of 100 parts by weight of the positive active material. When the amount of the conductive agent is within this range, the conductivity characteristics of the resultant electrode may be improved.

Non-limiting examples of the solvent include N-methyl pyrrolidone, and/or the like.

The amount of the solvent may be about 1 part by weight to about 10 parts by weight based on a total weight of 100 parts by weight of the positive active material. When the amount of the solvent is within this range, the active material layer may be easily formed.

The positive current collector may have a thickness of about 3 µm to about 500 µm. The material for the positive current collector is not particularly limited as long as it does not cause a chemical change in the battery (e.g. an unwanted chemical reaction) and has high conductivity, and may be for example, stainless steel, aluminum, nickel, titanium, heat-treated carbon, and/or aluminum or stainless steel that is surface treated with carbon, nickel, titanium, and/or silver. The current collector may have fine irregularities formed on its surface to increase adhesion to the positive active material, and may be provided in any suitable form (such as a film, a sheet, a foil, a net, a porous body, foam, and/or a non-woven fabric body).

Separately, a negative active material, a binder, a conductive agent, and a solvent may be mixed to prepare a composition for a negative active material layer. The negative active material may be or include a material capable of intercalating and deintercalating lithium ions. Non-limiting examples of the negative active material include a carbon-based material (such as graphite and/or carbon), a lithium metal, an alloy thereof, a silicon oxide-based material, and/or the like. In some embodiments, silicon oxide may be used. The binder may be added in an amount of about 1 part by weight to about 50 parts by weight based on a total weight of 100 parts by weight of the negative active material. Non-limiting examples of the binder may be substantially the same as available for the positive electrode. The conductive agent may be used in an amount of about 1 part by weight to about 5 parts by weight based on a total weight of 100 parts by weight of the negative active material. When the amount of the conductive agent is within this range, the conductivity characteristics of the resultant electrode may be improved. An amount of the solvent may be about 1 part by weight to about 10 parts by weight based on a total weight of 100 parts by weight of the negative active material. When the amount of the solvent is within this range, the negative active material layer may be easily formed. The conductive agent and the solvent may use substantially the same materials as those used in manufacturing the positive electrode. The negative current collector may have a thickness of about 3 µm to about 500 µm. The material for the negative current collector is not particularly limited as long as it does not cause a chemical change in the battery (e.g. an unwanted chemical reaction) and has high conductivity. Non-limiting examples include copper; stainless steel; aluminum; nickel; titanium; heat-treated carbon; copper and/or stainless steel surface-treated with carbon, nickel, titanium, and/or silver; an aluminum-cadmium alloy; and/or the like. The negative current collector may have fine irregularities formed on the surface to increase adhesion to the negative active materials, and may be provided in any suitable form (such as a film, a sheet, a foil, a net, a porous body, foam, and/or a non-woven fabric body), similar to the positive current collector.

A separator may be between the positive electrode and the negative electrode, each being manufactured according to the above processes. The separator may have a pore diameter of about 0.01 µm to about 10 µm, and a thickness of about 5 µm to about 300 µm. Non-limiting examples include an olefin-based polymer (such as polypropylene, polyethylene, and/or the like); and/or a sheet or a nonwoven fabric formed of a glass fiber. When a solid electrolyte such as a polymer is used as the electrolyte, the solid electrolyte may also serve as the separator.

A lithium salt-containing non-aqueous electrolyte may be composed of a non-aqueous electrolyte and a lithium salt. The non-aqueous electrolyte may be a non-aqueous electrolyte, an organic solid electrolyte, or an inorganic solid electrolyte. The non-aqueous electrolyte may be or include, for example, an aprotic organic solvent (such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethyl sulfoxide, 1,3-dioxolane, formamide, N,N-dimethyl formamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and/or the like). The organic solid electrolyte may be, for example, a polyethylene derivative, a polyethylene oxide derivative, a polypropylene oxide derivative, a phosphoric acid ester polymer, polyester sulfide, polyvinyl alcohol, polyvinylidene fluoride, and/or the like. The inorganic solid electrolyte may be, for example, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and/or the like. The lithium salt may be a material that is readily soluble in the non-aqueous electrolyte, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonates, tetraphenyl lithium borate, lithium imides, and/or the like.

The positive electrode 23, the negative electrode 22, and the separator 24 are wound or folded and accommodated in the battery case 25. Then, an organic electrolyte solution is injected into the battery case 25 and the cap assembly 26 is sealed to complete the rechargeable lithium battery 21 as shown in FIG. 4. The battery case 25 may have any suitable shape or form (such as cylindrical, prismatic, thin film, and/or the like). In some embodiments, the rechargeable lithium battery 20 may be a large-scale thin film-type battery. The rechargeable lithium battery may be a lithium ion battery. For example, a cell structure including a separator between the positive electrode and the negative electrode may be formed. The cell may be stacked in a bi-cell structure and then impregnated with an organic electrolyte solution, and the resulting product may be placed in a pouch and sealed to manufacture a lithium ion polymer battery. In some embodiments, a plurality of cell structures may be stacked to form a battery pack, which may be used in devices requiring a high capacity and high power. For example, the battery pack may be used in a laptop, a smart phone, an electric vehicle, and/or the like.

In some embodiments, the rechargeable lithium battery may have improved storage stability, cycle-life characteristics, and high rate capacity characteristics at a high temperature, and may be used in an electric vehicle (EV). For example, it may be used in a hybrid vehicle such as a plug-in hybrid electric vehicle (PHEV). The rechargeable lithium battery according to embodiments of the present disclosure may exhibit improved electrode plate density with respect to the positive active material, and thus may have suitable electrochemical characteristics for a rechargeable lithium battery.

Because the residual lithium concentration in the positive electrode is minimized or reduced, gas generation inside the cell from a reaction of residual lithium with the electrolyte solution may be minimized or reduced so that the rechargeable lithium battery according to one embodiment has high cell stability, and because gelation of the residual lithium is minimized or reduced, a stable positive electrode may be formed.

Hereinafter, a method of preparing the positive active material for a rechargeable lithium battery according to embodiments of the present disclosure is described.

The method of preparing a positive active material for a rechargeable lithium battery includes forming a first nickel-based oxide using a first precursor, obtaining a second nickel-based oxide using a second precursor, mixing the first nickel-based oxide and the nickel-based oxide, and subjecting the mixture to third heat-treatment under an oxidizing gas atmosphere to obtain a positive active material including a first positive active material and a second positive active material. Hereinafter, the method is explained in more detail.

First, the first precursor is subjected to a first heat-treatment under an oxidizing gas atmosphere to obtain the first nickel-based oxide.

In some embodiments, the oxidizing gas atmosphere may use an oxidizing gas (such as oxygen and/or air). The first heat-treatment may be, for example, performed at about 800° C. to about 900° C. A time for the first heat-treatment may be selected according to the heat-treatment temperature and/or the like, and for example, may be about 5 to about 15 hours. The first precursor according to embodiments of the present disclosure may include Li, Ni, Co, Mn, and optionally an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); the elements may be included in set or predetermined mole ratios, for example, within ranges satisfying each stoichiometric ratio.

In some embodiments, the first precursor may be obtained by mixing a first composite metal hydroxide with a lithium-based material.

The first composite metal hydroxide may include at least nickel, and may further include elements selected from the above group within a range satisfying a stoichiometric ratio, and the nickel and additional elements may be bound to a hydroxyl group. For example, the first composite metal hydroxide may be a nickel-based composite metal hydroxide, for example, a nickel-cobalt-aluminum hydroxide, or a nickel-cobalt-manganese hydroxide.

The lithium-based material may serve as a lithium source, so that the product positive active material for a rechargeable lithium battery according to embodiments of the present disclosure may function as a positive active material. The type or kind of lithium-based material according to embodiments of the present disclosure is not particularly limited and may include, for example, $Li_2CO_3$, $LiOH$, a hydrate thereof, or a combination thereof.

For example, the first precursor may be a mixture of a nickel-based composite metal hydroxide and a lithium-based material. The first nickel-based oxide obtained by the first heat-treatment of the first precursor in an oxidizing gas atmosphere may be a lithium nickel-based composite oxide, for example, a lithium nickel-cobalt-aluminum oxide or a lithium nickel-cobalt-manganese oxide.

In some embodiments, the second precursor, separately from the first precursor, may be subjected to a second heat-treatment under an oxidizing gas atmosphere. The resulting material may be pulverized to obtain the second nickel-based oxide including particles having a monolith structure. For example, the process of obtaining the second nickel-based oxide may further include pulverizing the material obtained after subjecting the second precursor to the second heat-treatment in an oxidizing gas atmosphere, the resulting particles having a monolith structure.

In some embodiments, the oxidizing gas atmosphere may use an oxidizing gas (such as oxygen and/or air). The second heat-treatment may be, for example, performed at about 800° C. to about 1000° C. A time for the second heat-treatment may be selected according to the heat-treatment temperature and/or the like, and for example, may be about 5 to about 20 hours. The second precursor may be obtained by mixing a second composite metal hydroxide with the aforementioned lithium-based material.

The second composite metal hydroxide may include Li, Ni, Co, Mn, and optionally an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); the elements may be included in set or predetermined mole ratios, for example, within ranges satisfying each stoichiometric ratio. The elements (including at least nickel and a hydroxyl group) may be bound in a range satisfying a stoichiometric ratio. The second composite metal hydroxide may be, for example, a nickel-based composite metal hydroxide, for example, a nickel-cobalt-aluminum hydroxide, or a nickel-cobalt-manganese hydroxide.

An average particle diameter of the second composite metal hydroxide may be, for example, greater than or equal to about 0.5 μm, greater than or equal to about 1.0 μm, greater than or equal to about 1.5 μm, greater than or equal to about 2.0 μm, and for example, less than or equal to about 10 μm, less than or equal to about 8 μm, less than or equal to about 6 μm, less than or equal to about 5 μm, or less than or equal to about 4 μm.

In some embodiments, the second composite metal hydroxide may have a specific surface area of about 1 $m^2/g$ to about 30 $m^2/g$, as measured using a BET method. For example, the specific surface area may be about 2 $m^2/g$ to about 25 $m^2/g$, for example, about 5 $m^2/g$ to about 25 $m^2/g$. When the second composite metal hydroxide has a specific surface area satisfying this range, the second nickel-based oxide may be pulverized into particles having a monolith structure within the above average particle diameter range during a pulverization process described below, thereby reducing an amount of residual lithium.

The second nickel-based oxide obtained by performing the second heat-treatment of the second precursor in an oxidizing gas atmosphere may be a lithium nickel-based composite oxide, for example, a lithium nickel-cobalt-aluminum oxide, or a lithium nickel-cobalt-manganese oxide.

Subsequently, the materials subjected to the second heat-treatment may be pulverized to obtain the second nickel-based oxide including the particles having a monolith structure within the above average particle diameter range. The second nickel-based oxide may have a smaller average particle diameter than the above first nickel-based oxide. The pulverization may be performed using any suitable pulverizing device (such as a jet mill and/or the like).

The particles having a monolith structure and the average particle diameter range described above may not be agglomerated, but dispersed as described above. The amounts and/or a mixing ratio of the lithium-based material and the second composite metal hydroxide are not particularly limited, but may simultaneously (concurrently) be adjusted within a suitable range to minimize or reduce the amount of excess lithium salt and thereby the lithium-based material residue after preparing the nickel-based active material.

In some embodiments, a mole ratio (Li/Me) e.g., of lithium (Li) relative to the remaining metal elements (Me) in the second precursor may be, for example, greater than or equal to about 0.8, greater than or equal to about 0.85, greater than or equal to about 0.9, greater than or equal to about 0.95, or greater than or equal to about 1.0, and for example, less than or equal to about 1.2, less than or equal to about 1.1, or less than or equal to about 1.05.

In some embodiments, a mole ratio of Ni, Co, Mn, and additional selected elements in the first composite metal hydroxide and the second composite metal hydroxide may be freely selected within a range for preparing the nickel-based positive active material represented by Chemical Formula 1, but a mole ratio of Ni may be adjusted to be larger than the mole ratios of Co, Mn, and the additional selected elements. In some embodiments, the second precursor according to embodiments of the present disclosure may be adjusted to have the same mole ratio as the above first precursor.

Subsequently, the first nickel-based oxide is mixed with the second nickel-based oxide. In some embodiments, a mixing ratio of the first nickel-based oxide and the second nickel-based oxide may be, for example, about 9:1 to about 5:5, about 8:2 to about 5:5, about 8:2 to about 6:4, or about 7:3 based on weight. When the mixing ratio of first nickel-based oxide and the second nickel-based oxide satisfies the above ranges, the positive active material for a rechargeable lithium battery has a suitable residual lithium compound concentration, and when an electrode plate is manufactured utilizing the same, excellent electrode plate density may be secured, and the XRD peak intensity ratio (I(003)/I(104)) of the positive electrode may be suitably secured to be greater than or equal to about 3 to resultantly obtain a rechargeable lithium battery having high-capacity characteristics and improved cycle-life characteristics.

Subsequently, the mixture of the first nickel-based oxide and the second nickel-based oxide may be subjected to a third heat-treatment under an oxidizing gas atmosphere.

The oxidizing gas atmosphere may include an oxidizing gas (such as oxygen and/or air).

The third heat-treatment may be performed, for example, at about 800° C. to about 1000° C.

A time for the third heat-treatment may be selected according to the heat-treatment temperature and/or the like, and for example, may be about 3 to about 10 hours.

When the heat-treatment is completed, the temperature may be cooled down to room temperature (e.g., about 25° C.) to prepare a positive active material for a rechargeable lithium battery according to embodiments of the present disclosure. The prepared positive active material for a rechargeable lithium battery may include the first positive active material including the secondary particle including at least two agglomerated primary particles, along with the second positive active material having a monolith structure as described above, and at least one part of the primary particles in the secondary particle may be arranged in a radial shape.

The above preparing method may provide a positive active material for a rechargeable lithium battery within the above residual lithium concentration range without a residual lithium removal process (such as a separately additional washing process and/or the like). The positive active material and a rechargeable lithium battery including the same may show excellent stability and electrochemical characteristics, as described above. The prepared positive active material and the rechargeable lithium battery including the same may show excellent stability and electrochemical characteristics, as described above.

Another embodiment provides a method of preparing a positive electrode for a rechargeable lithium battery. The method of preparing the positive electrode includes preparing the aforementioned positive active material; mixing the positive active material, a conductive agent, and a binder in a solvent to prepare a positive active material slurry; coating the positive active material slurry on a current collector; drying the coated positive active material slurry to prepare a positive electrode; and pressing the positive electrode to a density of greater than or equal to about 3.4 g/cc.

Herein, descriptions of the positive active material, the conductive agent, the binder, and the solvent are as described above. The positive active material slurry may be, for example, a mixture of about 90 wt % to about 98 wt % of the positive active material, about 1 wt % to about 5 wt % of the conductive agent, and about 1 wt % to about 5 wt % of the binder.

In the method of manufacturing the positive electrode for rechargeable lithium battery, the positive electrode may have a pressed density of greater than or equal to about 3.4 g/cc, for example, greater than or equal to about 3.45 g/cc, or greater than or equal to about 3.50 g/cc, greater than or equal to about 3.55 g/cc, or greater than or equal to about 3.60 g/cc. When the pressed density satisfies the ranges, the X-ray diffraction peak intensity ratio I(003)/I(104) of the positive electrode may be suitably secured to be greater than or equal to 3, resulting in excellent cycle-life characteristics and safety. The battery capacity per volume may be increased to realize a high-capacity rechargeable lithium battery, and high charge and discharge efficiency may be obtained by preventing or reducing insufficient electrolyte impregnation, rate capability deterioration, crushing of active material particles, current collector breakage, and/or the like during the manufacturing process.

Hereinafter, the embodiments are illustrated in more detail with reference to examples. These examples, however, are not in any sense to be interpreted as limiting the scope of the disclosure.

Example 1

1. Precursor Process
(1) Preparing Process of First Nickel-Based Oxide

A first composite metal hydroxide ($Ni_{0.6}Co_{0.2}Mn_{0.2}H$) was synthesized using a co-precipitation method to prepare a first nickel-based oxide. In the following preparing process, the first composite metal hydroxide was synthesized using raw metal materials (such as nickel sulfate, cobalt sulfate, and manganese sulfate).

First Act: 1.5 $kW/m^3$, $NH_4OH$ 0.30 M, pH 10 to 11, Reaction Time: 6 Hours

First, ammonium hydroxide having a concentration of 0.30 M was put in a reactor. The raw metal material and a complexing agent were added thereto at a rate of 90 mL/min and 10 mL/min, respectively, with an agitation power of 1.5 $kW/m^3$ at a reaction temperature of 50° C. to start the reaction.

The reaction proceeded for 6 hours, during which time NaOH was injected to maintain pH. The core particles obtained from the reaction had an average size of about 5.5 μm to about 6.5 μm. The second act was performed as follows.

Second Act: 1.0 $kW/m^3$, $NH_4OH$ 0.35 M, pH 10 to 11, Reaction Time: 6 Hours

The complexing agent was maintained at a concentration of 0.35 M by changing the addition rates of the raw metal material and the complexing agent to 100 ml/min and 15 ml/min, respectively, while the reaction temperature was maintained at 50° C. The reaction proceeded for 6 hours, during which time NaOH was injected to maintain pH. Herein, the agitation power was adjusted to 1.0 $kW/m^3$, which is lower than that of the first act. The particles having a core and a middle layer, as obtained from the reaction, had an average size of about 9 μm to about 10 μm.

Third Act: 1.0 $W/m^3$, $NH_4OH$ 0.40 M, pH 10 to 11, Reaction Time: 4 Hours

The complexing agent was maintained at a concentration of 0.40 M by changing the addition rates of the raw metal material and the complexing agent to 150 ml/min and 20 ml/min, respectively, while the reaction temperature was maintained at 50° C. The reaction proceeded for 4 hours, during which time NaOH was injected to maintain pH. At this time, the agitation power was maintained as in second act.

Post-Processing

The resultant material was washed and dried with hot air at about 150° C. for 24 hours to obtain a first composite metal hydroxide ($Ni_{0.6}Co_{0.2}Mn_{0.2}H$).

Subsequently, the obtained first composite metal hydroxide was mixed with LiOH in a mole ratio of 1:1 to obtain a first precursor, and the first precursor was primarily heat-treated at about 800° C. for 6 hours under an oxygen atmosphere to obtain a first nickel-based oxide ($LiNi_{0.6}Co_{0.2}Mn_{0.2}O_2$). An average particle diameter of the first nickel-based oxide was 12.5 μm.

(2) Preparing Process of Second Nickel-Based Oxide

Separately from the above, nickel sulfate ($NiSO_4.6H_2O$), cobalt sulfate ($CoSO_4.7H_2O$), and manganese sulfate ($MnSO_4. H_2O$) in a mole ratio of 6:2:2 were dissolved in distilled water (as a solvent) to prepare a mixed solution. An ammonium hydroxide ($NH_4OH$) dilute solution and sodium hydroxide (NaOH) as a precipitator were prepared as precursors for forming a complexing compound. Subsequently, the raw metal material mixed solution, the ammonium hydroxide, and the sodium hydroxide were added to a reactor. The obtained mixture was reacted for 15 hours while being stirred. Subsequently, the obtained slurry solution in the reactor was filtered, washed with distilled water having high purity, and dried for 24 hours to yield a second composite metal hydroxide ($Ni_{0.6}Co_{0.2}Mn_{0.2}(OH)_2$) powder. The second composite metal hydroxide powder had an average particle diameter of about 3.2 μm and a specific surface area of about 13 $m^2/g$ as measured using a BET method.

Subsequently, the obtained second composite metal hydroxide powder was mixed with $LiCO_3$ to satisfy Li/(Ni+Co+Mn)=1.02 to obtain a second precursor, and the second precursor was put in a furnace and secondarily heat-treated at 910° C. for 11 hours under an air atmosphere to obtain second nickel-based oxide ($LiNi_{0.6}Co_{0.2}Mn_{0.2}O_2$). The obtained second nickel-based oxide was pulverized for about 30 minutes to separate/disperse a plurality of second positive active materials having a monolith structure.

2. Preparing Process of Positive Active Material

Subsequently, the obtained first nickel-based oxide was mixed with the second nickel-based oxide including a plurality of second positive active materials having the monolith structure through the pulverization in a weight ratio of 7:3 and then, put in a furnace and thirdly heat-treated at about 850° C. for 6 hours under an oxygen atmosphere. Then, the furnace was cooled down to room temperature to obtain a positive active material for a rechargeable lithium battery in which the first positive and second positive active materials were mixed.

In the obtained positive active material for a rechargeable lithium battery, as described above, the first positive active material, where the primary particles were agglomerated to form the secondary particles, but at least some of the primary particles were radially aligned, was mixed with the second positive active material having a monolith structure.

Comparative Example 1

A positive active material for a rechargeable lithium battery according to Comparative Example 1 was obtained according to substantially the same method as Example 1, except that the second nickel-based oxide was not pulverized, but was directly mixed with the first nickel-based oxide.

Comparative Example 2

A positive active material for a rechargeable lithium battery according to Comparative Example 2 was obtained according to substantially the same method as Example 1, except that a second composite metal hydroxide having an average particle diameter of 3.2 μm and a specific surface area of 33 m²/g (as measured in a BET method), was not pulverized after the second heat treatment, but was directly mixed with the first nickel-based oxide.

Comparative Example 3

The first composite metal hydroxide and the second composite metal hydroxide according to Example 1 were mixed to satisfy lithium hydroxide (LiOH.H₂O) and Li/(Ni+Co+Mn)=1.02.

Subsequently, the mixed materials was put in a furnace and primarily heat-treated at about 850° C. for 6 hours and then, secondarily heat-treated at the same temperature for 6 hours. Then, the furnace was cooled down to room temperature to obtain a positive active material for a rechargeable lithium battery according to Comparative Example 3.

Evaluation Example 1

Residual Lithium and Compression Density of Positive Active Material

The positive active materials for a rechargeable lithium battery according to Example 1 and Comparative Example 1 to 3 were measured with respect to residual amounts of $Li_2O_3$ and LiOH and a concentration of residual Li, and the results are shown in Table 1.

The positive active materials for a rechargeable lithium battery according to Example 1 and Comparative Examples 1 to 3 were measured with respect to each pressed density in the above method, and the results are shown in Table 1.

TABLE 1

| | Residual $Li_2O_3$ (wt %) | Residual LiOH (wt %) | Residual Li concentration (ppm) | Compression density (g/cc) |
|---|---|---|---|---|
| Example | 0.105 | 0.265 | 967 | 3.43 |
| Comparative Example 1 | 0.109 | 0.271 | 1000 | 3.22 |
| Comparative Example 2 | 0.116 | 0.277 | 1022 | 3.22 |
| Comparative Example 3 | 0.221 | 0.395 | 1542 | 3.19 |

Referring to Table 1, the positive active material for a rechargeable lithium battery according to Example 1 exhibited mostly small residual amounts of $Li_2O_3$ and LiOH and a low residual lithium concentration, compared with those of Comparative Examples and particularly, that of Comparative Example 3. On the other hand, Example 1 and Comparative Examples 1 and 2 exhibited mostly similar residual lithium concentrations.

On the other hand, the positive active material for a rechargeable lithium battery according to Example 1 exhibited excellent pressed density, compared with those of Comparative Examples 1 to 3. The pressed density of 3.43 g/cc of Example 1 was greater than 70% of theoretical density of about 4.8 g/cc of a positive active material for a rechargeable lithium battery having the same composition. Accordingly, the positive active material for a rechargeable lithium battery according to Example 1 might be used to minimize or reduce the residual lithium concentration and simultaneously, have an advantage in forming an electrode plate due to low pressed density, compared with those of the comparative examples.

Manufacture of Positive Electrode for Rechargeable Lithium Battery

Example 1, Comparative Examples 1 to 3, and Comparative Example 4 (described below), were respectively used to manufacture positive electrodes for rechargeable lithium battery. 96 g of the positive active material for a rechargeable lithium battery according to each of Example 1 and Comparative Examples 1 to 3, 2 g of polyvinylidene fluoride, 137 g of N-methylpyrrolidone as a solvent, and 2 g of carbon black as a conductive agent were mixed and degassed using a blender to obtain a substantially uniformly-dispersed slurry for a positive active material layer.

The slurry for a positive active material layer was coated on an aluminum foil and thus formed into a thin electrode plate, dried at 135° C. for greater than or equal to 3 hours, and pressed and vacuum-dried to manufacture a positive electrode. Herein, the positive electrode of Example 1 was pressed to have a density of 3.62 g/cc.

Comparative Example 4

A positive active material and a positive electrode were manufactured according to substantially the same method as Example 1, except that the electrode plate of Comparative Example 4 was manufactured to have pressed density of 3.05 g/cc.

Evaluation Example 2

X-Ray Diffraction Peak Intensity Ratio of Electrode Plate

An X-ray diffraction analysis of the positive electrodes according to Example 1 and Comparative Example 4 was performed, and a ratio of a peak intensity of the (003) plane relative to a peak intensity of the (104) plane, e.g., I(003)/I(104), is shown in Table 2. Herein, the X-ray diffraction analysis was performed utilizing an X'pert made by Phillips, and CuK-alpha (a wavelength of 1.5405980 Å) was used as an excitation source.

TABLE 2

| | mixture density (g/cc) of positive electrode | I(003)/I(104) peak intensity ratio of electrode plate |
|---|---|---|
| Example 1 | 3.62 g/cc | 3.24 |
| Comparative Example 4 | 3.05 g/cc | 1.85 |

Referring to Table 2, Example 1 exhibited an I(003)/I(104) peak intensity ratio of greater than or equal to 3, and Comparative Example 4 exhibited an I(003)/I(104) peak intensity ratio of less than 3, wherein the ratio is the XRD peak intensity on the (003) plane relative to the peak intensity on the (104) plane with respect to the electrode plate.

Manufacture of Rechargeable Lithium Battery Cell

Example 1 and Comparative Examples 1 to 4 were used to manufacture each coin half-cell through the following process. Each positive electrode according to Example 1 and Comparative Examples 1 to 4 was used along with a lithium metal counter electrode as a counter electrode to manufacture 2032 type coin half-cells. Between the positive electrode and the lithium metal counter electrode, a separator formed of a porous polyethylene (PE) film (a thickness: about 16 µm) was disposed, and then, an electrolyte solution was injected thereinto to manufacture the 2032 type coin cells. Herein, the electrolyte solution was prepared by mixing ethylene carbonate (EC) and ethyl methyl carbonate (EMC) in a volume ratio of 3:5, and dissolving 1.1 M $LiPF_6$ therein.

Evaluation Example 3

Charge and Discharge Capacity and Efficiency of Battery Cell

The coin half-cells according to Example 1 and Comparative Examples 1 to 4 were charged at a constant current (0.1 C) and a constant voltage (4.3 V, 0.05 C cut-off), paused for 10 minutes, and discharged down to 3.0 V at a constant current (0.1 C) to measure charge/discharge capacity and efficiency, and the results are shown in Table 3.

On the other hand, the coin half-cells manufactured utilizing the positive active materials of Example 1 and Comparative Examples 1 to 4 were measured with respect to charge and discharge capacity (mAh/g) per weight and then, multiplied by the pressed density (g/cc) to obtain the capacity per volume (mAh/cc) of the coin half-cells of the example and the comparative examples, and the results are shown in Table 3.

TABLE 3

| | 0.1 C charge capacity (mAh/g) | 0.1 C discharge capacity (mAh/g) | 0.1 C charge/discharge efficiency (%) | Capacity per volume (mAh/cc) |
|---|---|---|---|---|
| Example 1 | 199.0 | 179.3 | 90.1 | 615.0 |
| Comparative Example 1 | 199.1 | 139.2 | 90.0 | 577.0 |
| Comparative Example 2 | 198.9 | 181.7 | 91.4 | 585.1 |
| Comparative Example 3 | 197.9 | 183.5 | 92.7 | 585.4 |
| Comparative Example 4 | 196.4 | 172.8 | 88.0 | 545.7 |

Referring to Table 3, the coin half-cell of Example 1 exhibited similar or improved charge/discharge characteristics, compared with those of Comparative Examples 1 to 4, and accordingly, the nickel-based active material according to one embodiment may be suitably used as a positive active material for a secondary battery.

The coin half-cell of Example 1 exhibited a high capacity per volume, compared with those of the comparative examples, and accordingly, a secondary battery cell using the positive active material for a rechargeable lithium battery according to Example 1 may exhibit excellent electrochemical characteristics.

Comparative Example 4 having a peak intensity ratio I(003)/I(104) of less than 3 in the electrode plate exhibited insufficient (relatively decreased) charge and discharge capacity, charge and discharge efficiency, and capacity per volume. In contrast, Example 1 having a peak intensity ratio I(003)/I(104) of an electrode plate of greater than or equal to 3 exhibited improved charge capacity, discharge capacity, and charge and discharge efficiency, compared with Comparative Example 4.

Evaluation Example 4

Cycle-Life Characteristics

The coin half-cells according to Example 1 and Comparative Example 4 were constant current-charged up to 4.25 V (vs. Li) at a 1.0 C rate and then, maintained in constant voltage mode of 4.25 V at 25° C. with a cut off at a 0.05 C rate. Subsequently, the coin half-cells were discharged down to 3.0 V (vs. Li) at a 1.0 C rate, where the charging and discharging were together regarded as one cycle and repeated up to 50 cycles. A 10 minute pause (rest) was set (included) after each charge/discharge cycle. The capacity retention was calculated according to Equation 1, and the results are shown in Table 4.

$$\text{Capacity retention at the } 50^{th} \text{ cycle [\%]} = [\text{discharge capacity at } 50^{th} \text{ cycle/discharge capacity at the first cycle}] \times 100 \quad \text{[Equation 1]}$$

TABLE 4

| | Capacity retention at the $50^{th}$ cycle (%) |
|---|---|
| Example 1 | 95.2 |
| Comparative Example 4 | 89.5 |

Referring to Table 4, Example 1 having an XRD peak intensity ratio of the (003) plane relative to the (104) plane of greater than or equal to 3 in the electrode plate exhibited greatly improved cycle-life characteristics, compared with e.g., Comparative Example 4.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims and equivalents thereof.

<Description of Some of the Symbols>

| | |
|---|---|
| 21: rechargeable lithium battery | 22: negative electrode |
| 23: positive electrode | 24: separator |
| 25: battery case | 26: cap assembly |

What is claimed is:

1. A positive electrode for a rechargeable lithium battery, comprising:
a positive active material comprising:
a first positive active material comprising a secondary particle comprising at least two agglomerated primary particles, where at least one part of the primary particles has a radial arrangement structure; and
a second positive active material having a monolith structure,
wherein the first positive active material and the second positive active material each comprise a nickel-based positive active material, and
an X-ray diffraction (XRD) peak intensity ratio (I(003)/I(104)) of the positive electrode is greater than or equal to about 3.

2. The positive electrode of claim 1, wherein the X-ray diffraction (XRD) peak intensity ratio (I(003)/I(104)) of the positive electrode is greater than or equal to about 3.2.

3. The positive electrode of claim 1, wherein the positive electrode for the rechargeable lithium battery has a mixture density of greater than or equal to about 3.4 g/cc.

4. The positive electrode of claim 1, wherein the second positive active material is comprised in an amount of about 10 wt % to about 50 wt % based on a total weight of the positive active material.

5. The positive electrode of claim 1, wherein, in the first positive active material,
the secondary particle comprises a radial arrangement structure, or
the secondary particle comprises an internal part comprising an irregular porous structure and an external part comprising the radial arrangement structure.

6. The positive electrode of claim 1, wherein, in the first positive active material,
the primary particles have a plate shape, and a long-axis of the at least one part of the primary particles is arranged in a radial direction.

7. The positive electrode of claim 1, wherein, in the first positive active material, an average length of the primary particles is about 0.01 μm to about 5 μm.

8. The positive electrode of claim 1, wherein an average particle diameter of the second positive active material is about 0.05 μm to about 10 μm.

9. The positive electrode of claim 1, wherein an average particle diameter of the second positive active material is about 3 μm to about 6 μm.

10. The positive electrode of claim 1, wherein a residual lithium concentration in the positive active material is less than or equal to about 1000 ppm.

11. The positive electrode of claim 1, wherein the first positive active material is represented by Chemical Formula 1:

$$Li_a(Ni_{1-x-y-z}Co_xMn_yM_z)O_2, \text{ and} \qquad \text{Chemical Formula 1}$$

wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
$0.95 \leq a \leq 1.3$, $x \leq (1-x-y-z)$, $y \leq (1-x-y-z)$, $0 < x < 1$, $0 \leq y < 1$, and $0 \leq z < 1$.

12. The positive electrode of claim 1, wherein the second positive active material is represented by Chemical Formula 1:

$$Li_a(Ni_{1-x-y-z}Co_xMn_yM_z)O_2, \text{ and} \qquad \text{Chemical Formula 1}$$

wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
$0.95 \leq a \leq 1.3$, $x \leq (1-x-y-z)$, $y \leq (1-x-y-z)$, $0 < x < 1$, $0 \leq y < 1$, and $0 \leq z < 1$.

13. A rechargeable lithium battery, comprising:
the positive electrode of claim 1;
a negative electrode; and
an electrolyte between the positive electrode and the negative electrode.

* * * * *